US007336597B2

(12) United States Patent
Maltsev et al.

(10) Patent No.: US 7,336,597 B2
(45) Date of Patent: Feb. 26, 2008

(54) SYSTEM AND METHOD FOR TWO CHANNEL FREQUENCY OFFSET ESTIMATION OF OFDM SIGNALS

(75) Inventors: Alexander A. Maltsev, Nizhny Novgorod (RU); Andrey V. Pudeyev, Nizhny Novgorod (RU); Alexei M. Soupikov, Nizhny Novgorod (RU); Dmitry V. Akhmetov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 916 days.

(21) Appl. No.: 10/675,240

(22) Filed: Sep. 30, 2003

(65) Prior Publication Data

US 2004/0190438 A1  Sep. 30, 2004

Related U.S. Application Data

(63) Continuation of application No. PCT/RU03/00126, filed on Mar. 28, 2003.

(51) Int. Cl.
*H04J 11/00* (2006.01)
(52) U.S. Cl. ...................................... 370/206
(58) Field of Classification Search ................ 375/260, 375/340, 343, 354, 355, 371; 455/516; 370/206, 370/503
See application file for complete search history.

(56) References Cited

U.S. PATENT DOCUMENTS

| 5,652,772 | A | 7/1997 | Isaksson et al. ............ 375/367 |
| 5,732,113 | A | 3/1998 | Schmidl et al. ............. 375/355 |
| 5,987,063 | A * | 11/1999 | Rinne ......................... 375/226 |
| 6,295,326 | B1 | 9/2001 | Tonissen et al. ............ 375/350 |
| 6,320,915 | B1 | 11/2001 | Stott et al. .................. 375/340 |
| 6,359,938 | B1 | 3/2002 | Keevill et al. .............. 375/316 |
| 6,363,128 | B1 | 3/2002 | Isaksson et al. ............ 375/355 |
| 6,658,063 | B1 | 12/2003 | Mizoguchi et al. |
| 6,731,594 | B1 * | 5/2004 | Bohnke ...................... 370/208 |
| 7,039,000 | B2 | 5/2006 | You et al. |

(Continued)

FOREIGN PATENT DOCUMENTS

EP  0645917 A2  3/1995

(Continued)

OTHER PUBLICATIONS

Chen, Bor-sen, et al., "Frequency Offset Estimation in an OFDM System", *2001 IEEE Third Workshop on Signal Processing Advances, Wireless Communications 2001*, (2001), 150-153.

(Continued)

*Primary Examiner*—David C. Payne
*Assistant Examiner*—Leon Flores
(74) *Attorney, Agent, or Firm*—Schwegman, Lundberg & Woessner, P.A.

(57) ABSTRACT

An orthogonal frequency division multiplexed (OFDM) receiver achieves improved frequency synchronization by generating a fine frequency offset of an OFDM packet with a two-channel frequency offset estimation scheme. Concurrent autocorrelations are performed with training symbols delayed by one and two durations of the training symbols. The respective correlation outputs are integrated over one and a half durations and one half duration to generate phase shift estimates. The phase shift estimates are weighted and combined to generate the fine frequency offset estimate which is used to rotate the phase of OFDM data symbols prior to performing a Fast Fourier Transform (FFT) on the data symbols.

26 Claims, 4 Drawing Sheets

U.S. PATENT DOCUMENTS

| | | | |
|---|---|---|---|
| 2002/0159533 A1 | 10/2002 | Crawford | 375/260 |
| 2002/0181509 A1 | 12/2002 | Mody et al. | 370/480 |
| 2003/0123582 A1* | 7/2003 | Kim et al. | 375/347 |
| 2004/0001563 A1 | 1/2004 | Scarpa | 375/326 |
| 2004/0005018 A1 | 1/2004 | Zhu et al. | |

FOREIGN PATENT DOCUMENTS

| | | |
|---|---|---|
| EP | 0825737 A1 | 2/1998 |
| EP | 0933903 A2 | 8/1999 |
| EP | 1005204 A2 | 5/2000 |
| EP | 1071251 A2 | 1/2001 |
| EP | 1083683 A2 | 3/2001 |
| EP | 1168745 A1 | 1/2002 |
| EP | 1220505 A2 | 7/2002 |
| EP | 1313283 A2 | 5/2003 |

OTHER PUBLICATIONS

Dacca, M. R., et al., "Frequency Offset Tracking in OFDM Based on Multicarrier PLL", *21st Century Military Communications Conference Proceedings*, vol. 2, (2000), 912-916.

Larsson, Erik G., et al., "Joint symbol timing and channel estimation for OFDM based WLANs", *IEEE Communications Letters*, vol. 5, No. 8, (Aug. 2001), 325-327.

Li, Jian, et al., "Carrier Frequency Offset Estimation for IFDM-Based WLANs", *IEEE Signal Processing Letters*, vol. 8, No. 3, (Mar. 2001), 80-82.

Matheus, Kirsten, et al., "Parameter Optimization for Decision Directed Frequency Tracking for Coherent OFDM", *Global Telecommunications Conference, 2000, IDDD* vol. 3, (2000), 1402-1406.

Morelli, Michele, et al., "Carrier-Frequency Estimation for Transmission over Selective Channels", *IEEE Transactions on Communications*, vol. 48, No. 9, (Sep. 2000), 1580-1589.

Perets, R., et al., "A New Phase and Frequency Offset Estimation Algorithm for OFDM Systems Applying Kalman Filter", *22nd Convention of Electrical and Electronics Engineers in Israel*, IEEE, XP010631136, (Dec. 1, 2002), 300-302.

Schmidl, Timothy M., "Robust Frequency and Timing Synchronization for OFDM", *IEEE Transactions on Communications*, vol. 45, No. 12, (Dec. 1997), 1613-1621.

Keller, T., et al., "Orthogonal Frequency Division Multiplex Synchronization Techniques for Frequency-Selective Fading Channels", *IEEE Journal on Selected Areas in Communications*, vol. 19, No. 6, (Jun. 2001), 999-1008.

\* cited by examiner

SYSTEM AND METHOD FOR TWO CHANNEL FREQUENCY OFFSET ESTIMATION OF OFDM SIGNALS

CROSS-REFERENCE TO RELATED APPLICATIONS

This application is a continuation under 37 C.F.R. 111(a) of International Application Serial No. PCT/RU03/00126, filed Mar. 28, 2003, which is incorporated herein by reference.

This application is related to the following co-pending, commonly assigned U.S. patent applications entitled "RECEIVER AND METHOD TO DETECT AND SYNCHRONIZE WITH A SYMBOL BOUNDARY OF AN OFDM SYMBOL", Ser. No. 10/675,213, filed on Sep. 30, 2003, and "RECEIVER AND METHOD TO [TBD]", Ser. No. 10/675,215, filed on Sep. 30, 2003. These commonly assigned patent applications are incorporated herein by reference.

TECHNICAL FIELD

The present invention pertains to wireless communications, and in one embodiment, to receivers for orthogonal frequency division multiplexed (OFDM) communications.

BACKGROUND

Orthogonal frequency division multiplexing (OFDM) is a multi-carrier transmission technique that uses orthogonal subcarriers to transmit information within an available spectrum. Because the subcarriers may be orthogonal to one another, they may be spaced much more closely together within the available spectrum than, for example, the individual channels in a conventional frequency division multiplexing (FDM) system. To help achieve orthogonality, a subcarrier may have a null at the center frequency of the other subcarriers. Orthogonality of the subcarriers may help prevent inter-subcarrier interference within the system. Before transmission, the subcarriers may be modulated with a low-rate data stream. The transmitted symbol rate of OFDM symbols may be low, and thus the transmitted OFDM signal may be highly tolerant to multipath delay spread within the channel. For this reason, many modern digital communication systems are turning to OFDM as a modulation scheme for signals that need to survive in environments having multipath reflections and/or strong interference. Many wireless communication standards have already adopted OFDM including, for example, the IEEE 802.11a standard, the Digital Video Broadcasting Terrestrial (DVB-T) broadcasting standard, and the High performance radio Local Area Network (HiperLAN) standard. In addition, several industry consortia, including the Broadband Wireless Internet Forum and the OFDM Forum, are proposing OFDM for fixed wireless access systems.

One problem with OFDM systems is that they may be more sensitive to phase noise and frequency offset relative to single carrier systems. Unlike single carrier systems, phase noise and frequency offset in OFDM systems introduce interference, including inter-carrier interference and inter-symbol interference. Conventional OFDM systems use a cyclic prefix and/or special training symbols to help achieve frequency synchronization, however channel effects, such as linear distortion, in a multipath channel make this a difficult task. Thus there is a general need for a system and method to improve frequency synchronization in an OFDM system.

BRIEF DESCRIPTION OF THE DRAWINGS

The appended claims are directed to some of the various embodiments of the present invention. However, the detailed description presents a more complete understanding of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

The present invention pertains to wireless communications, and in one embodiment, to receivers for orthogonal frequency division multiplexed (OFDM) communications. In accordance with one embodiment, a two-channel frequency offset estimation helps achieve frequency synchronization in an OFDM receiver system. A two-channel frequency offset estimation generates fine frequency offset estimate, which may be used to rotate the phase of OFDM data symbols prior to performing a Fast Fourier Transform (FFT).

Figure 1:
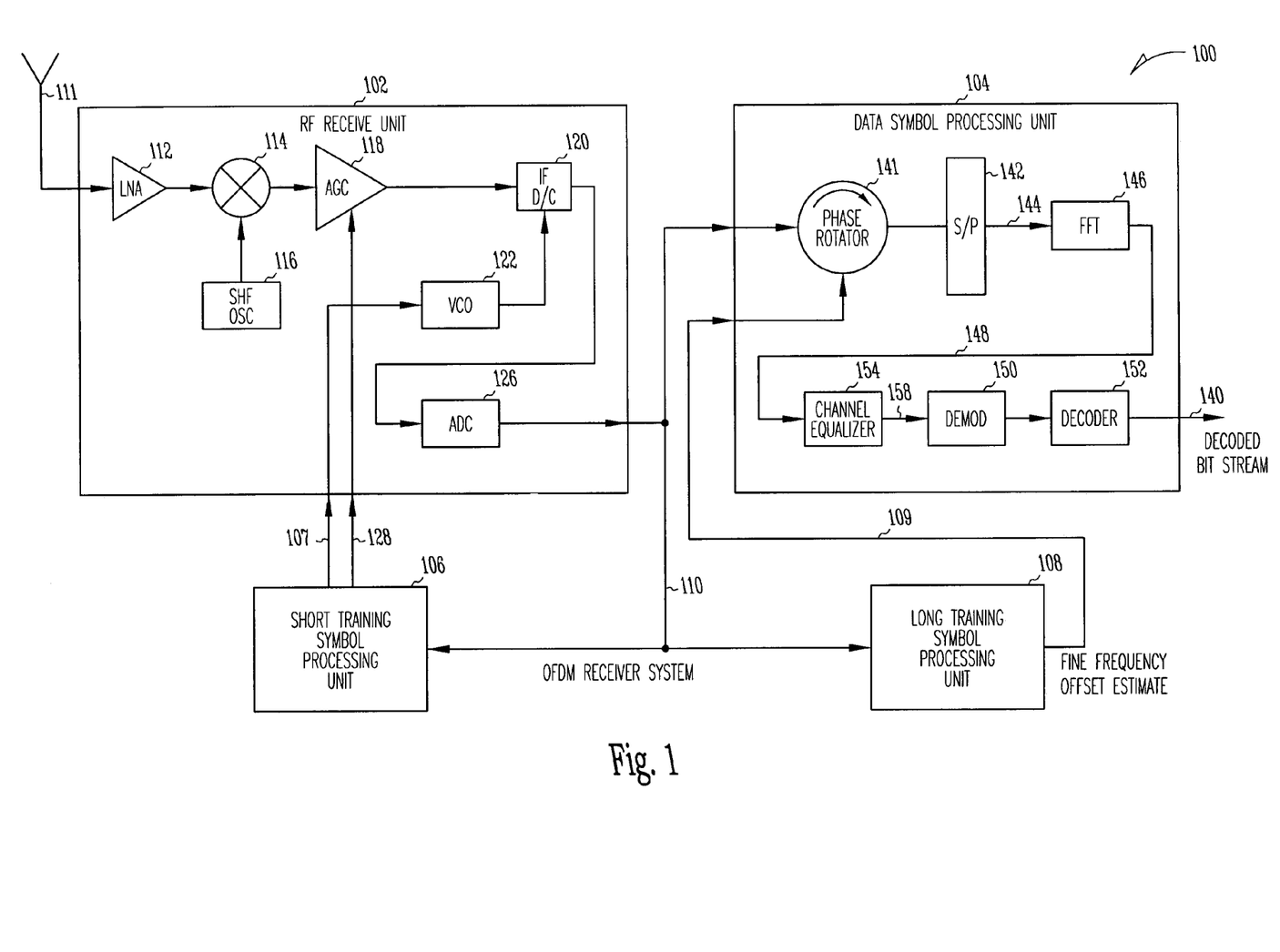
FIG. 1 is a simplified block diagram of an orthogonal frequency division multiplexed (OFDM) receiver system in accordance with an embodiment of the present invention.

FIG. 1 is a simplified block diagram of an orthogonal frequency division multiplexed (OFDM) receiver system in accordance with an embodiment of the present invention. OFDM receiver system 100 may be part a wireless communication device or may be part of a stand-alone receiver. OFDM receiver system 100 may be part of wireless communication devices such as personal digital assistants (PDAs), laptop and portable commuters with wireless communication capability, web tablets, wireless telephones, wireless headsets, pagers, instant messaging devices, MP3 players, digital cameras, and other devices that may receive and/or transmit information wirelessly. OFDM receiver system 100 may receive communication signals transmitted in accordance with a multi-carrier transmission technique, such as an orthogonal frequency division multiplexing (OFDM) technique, which may use substantially orthogonal subcarriers to transmit information within an assigned spectrum. OFDM receiver system 100 may receive communications in accordance with one or more communication standards, such as one of the IEEE 802.11a, b or g standards, the Digital Video Broadcasting Terrestrial (DVB-T) broadcasting standard, or the High performance radio Local Area Network (HiperLAN) standard. Communications in accordance with other local area network (LAN) and wireless local area network (WLAN) communication techniques may also be suitable for receipt by OFDM receiver system 100.

OFDM receiver system 100 may include RF receive unit 102, data symbol processing unit 104, short training symbol processing unit 106 and long training symbol processing unit 108. RF receive unit 102 receives signals through antenna 111 and generates serial symbol stream 110 representing OFDM symbols. Antenna 111 may be, for example, a dipole antenna, monopole antenna loop antenna, microstrip antenna or other type of antenna suitable for reception and/or transmission of OFDM signals. In one embodiment, an OFDM packet may include a plurality of short training symbols and a plurality of long training symbols followed by data symbols.

In one embodiment, the received signal may have a carrier frequency ranging between five and six GHz, although embodiments of the present invention are equally suitable to carrier frequencies, for example, ranging between one and ten 10 GHz. An OFDM signal may include up to a hundred or more subcarriers. The short training symbols may be transmitted on a portion of the subcarriers, and data symbols may contain one or more known pilot subcarriers although this is not a requirement. In one embodiment, the long training symbols may have a duration of approximately between three and four microseconds and the short training symbols may have a duration of up to approximately one microsecond.

RF receive unit 102 may perform a two-stage down conversion. RF receive unit 102 may include low-noise amplifier (LNA) 112 and RF down-converter 114. RF down-converter 114 may generate an intermediate frequency (IF) signal using signals from oscillator 116. Oscillator 116 may be fixed frequency heterodyne oscillator. Automatic gain control (AGC) element 118 may adjust a power level for IF down-converter 120 in response to AGC signal 128 from unit 106. IF down-converter (D/C) 120 may generate in-phase (I) signals and quadrature phase (Q) signals at zero frequency using a frequency controllable device such as voltage-controlled oscillator (VCO) 122, which may be responsive to coarse frequency offset signal 107. Coarse frequency offset signal 107 may be a part of a feedback loop and provided by short training symbol processing unit 106. The in-phase (I) signals and quadrature phase (Q) signals, provided by IF down-converter 120, may be sampled and converted to a digital bit stream by analog to digital converter (ADC) 126. The digital bit stream produce by ADC 126 may be serial symbol stream 110 of OFDM symbols in the case of an OFDM packet.

In one embodiment, short and long training symbol processing units 106 and 108 may perform packet detection and synchronization with OFDM symbol boundaries and may initiate data processing by data symbol processing unit 104. Data symbol processing unit 104 processes serial symbol stream 110 of OFDM symbols to generate decoded bit stream 140. In accordance with embodiments of the present invention, data symbol processing unit 104 may include phase rotator 141 to rotate the phase of symbols of symbol stream 110 in response to fine frequency offset estimate 109 provided by long training symbol processing element 108. Fine frequency offset estimate 109 may be determined from long training symbols of an OFDM packet. The phase-shift provided by phase rotator 141 may be held constant for processing the data symbols of the OFDM packet.

Data symbol processing unit 104 may also include serial to parallel converter 142 to convert a symbol into parallel groups of time domain samples 144. Data symbol processing unit 104 may also include FFT element 146, which may perform a Fast Fourier Transform (FFT) on parallel groups of time domain samples 144 to generate frequency domain symbol modulated subcarriers 148. In one embodiment, FFT element 146 may be responsive to a fine timing signal so that channel estimations may be made before data signal processing begins. Channel equalizer 154 may perform a channel equalization on frequency domain symbol modulated subcarriers 148 provided by FFT element 146. Channel equalizer 154 may generate channel equalized frequency domain symbol modulated subcarriers 158 using a channel estimation. Equalized frequency domain symbol modulated subcarriers 158 may be demodulated by demodulator 150 to produce a plurality of parallel symbols. Demodulator 150 may demodulate the subcarriers in accordance with a particular modulation order in which a transmitter modulated the subcarriers.

Modulation orders, for example, may include binary phase shift keying (BPSK), which communicates one bit per symbol, quadrature phase shift keying (QPSK), which communicates two bits per symbol, 8 PSK, which communicates three bits per symbol, 16-quadrature amplitude modulation (16-QAM), which communicates four bits per symbol, 32-QAM, which communicates five bits per symbol, and 64-QAM, which communicates six bits per symbol. Modulation orders may also include differentially coded star QAM (DSQAM). Modulation orders with lower and even higher communication rates may also be used. The parallel symbols from demodulator 150 may be converted from a parallel form to a serial stream. A de-interleaving operation may also be performed on the serial stream. Decoder 152 may decode the serial stream to generate decoded serial bit stream 140. Although OFDM receiver system 100 is illustrated as having several separate elements, one or more of the elements may be combined and may be implemented by combinations of software configured elements, such as processors including digital signal processors (DSPs), and/or other hardware elements.

Figure 2:
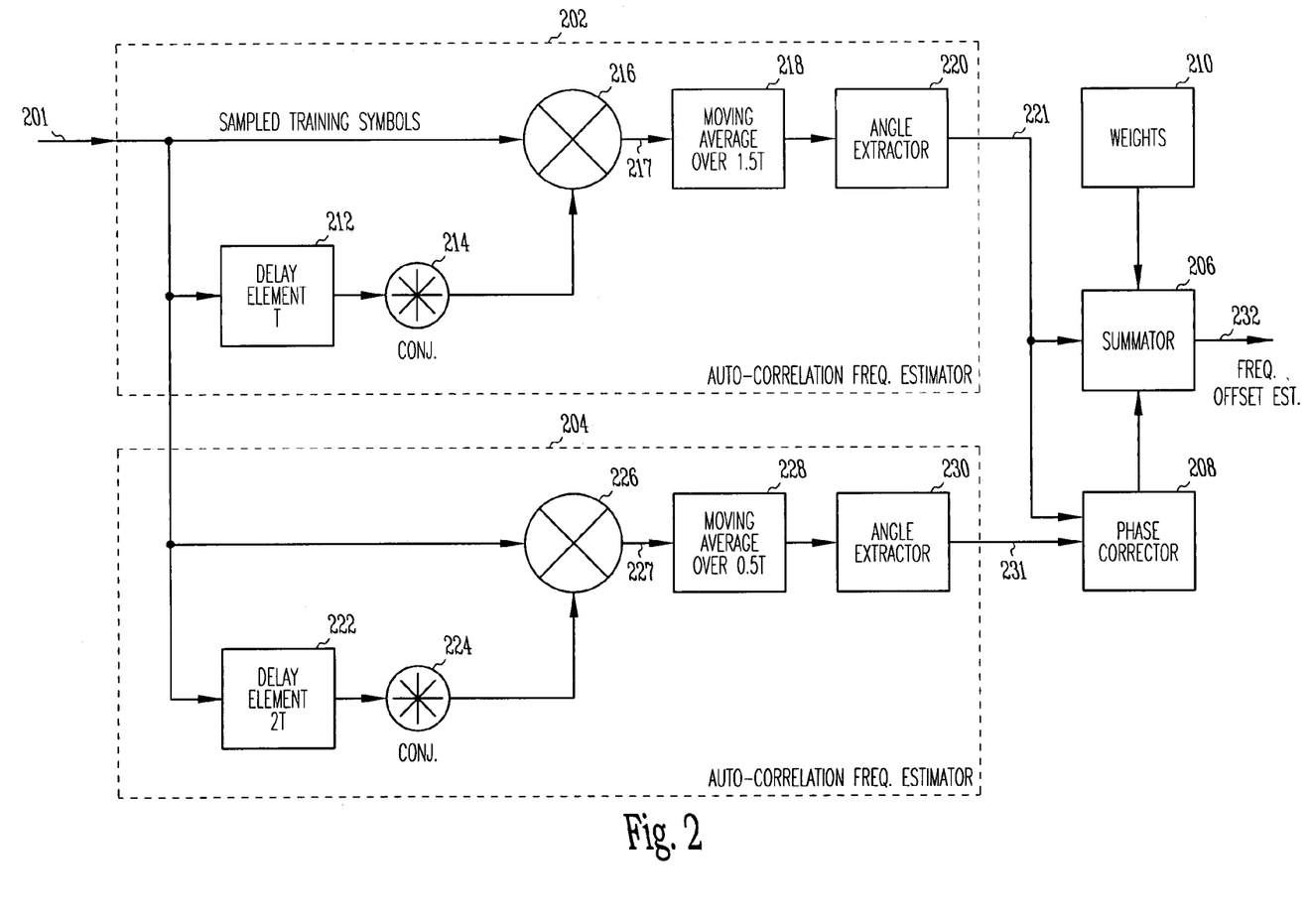
FIG. 2 is a simplified block diagram of a two-channel frequency offset estimator in accordance with an embodiment of the present invention.

FIG. 2 is a simplified block diagram of a two-channel frequency offset estimator in accordance with an embodiment of the present invention. Two-channel frequency offset estimator 200 may be used by an OFDM receiver, such as OFDM receiver system 100 (FIG. 1), to estimate a fine frequency offset of an OFDM packet using a two-channel frequency offset estimation scheme. The fine frequency offset estimate may be used to help achieve frequency synchronization to an OFDM packet. In accordance with this embodiment, concurrent autocorrelations may be performed with training symbols with differing delays. The respective correlation outputs may be integrated over different durations to generate phase shift estimates. The phase shift estimates may be weighted and combined to generate a fine frequency offset estimate. In one embodiment, the fine frequency offset estimate may be used to rotate the phase of OFDM data symbols prior to performing a FFT on the data symbols. In one embodiment, two-channel frequency offset estimator 200 may be included as part of long training symbol processing unit 108 (FIG. 1) to generate fine frequency offset estimate 109 (FIG. 1). In one embodiment, two-channel frequency offset estimator 200 may be a PHY level component of a wireless device. The elements of two-channel frequency offset estimator 200 illustrated in FIG. 2 may be implemented with hardware elements, software elements and combinations thereof, including with software configured processing elements. Furthermore, any two or more of the elements may be implemented together.

Two-channel frequency offset estimator 200 may use sampled training symbols of an OFDM packet to generate the fine frequency offset estimate, and in one embodiment, estimator 200 may use the long training symbols of an IEEE 802.11a packet to generate the fine frequency offset. In another embodiment, estimator may use the short training symbols of an IEEE 802.11a packet to generate a coarse frequency offset.

Two-channel frequency offset estimator 200 may include first autocorrelation frequency estimator 202 which may generate first phase shift estimate 221 from sampled training symbols 201. Two-channel frequency offset estimator 200 may also include second autocorrelation frequency estimator 204 which may generate second phase shift estimate 231 from sampled training symbols 201. First and second phase shift estimates 221 and 231 may be weighted and combined in summator 206 with weights 210 to generate frequency offset estimate 232. Phase corrector 208 may subtract out multiples of $2\pi$ from phase differences between first and second phase shift estimates 221 and 231, which may occur in the case of large initial frequency offsets.

First autocorrelation frequency estimator 202 includes first autocorrelation element 216 to perform a first autocorrelation on an input serial symbol stream of symbols and a delayed version of the input serial stream of symbols producing first correlation output 217. The input serial symbol stream of symbols may be sampled training symbols 201, which may correspond with serial symbol stream 110 (FIG. 1). Delay element 212 may delay sampled training symbols 201 by approximately a predetermined duration. Conjugation element 214 may generate a complex conjugate of the delayed sampled training symbols for use by correlation element 216. First moving average element 218 may perform a moving average over a predetermined number of durations on first correlation output 217. Angular extraction element 220 may extract first phase shift estimate 221 from a complex value generated by first moving average element 218.

In one embodiment, delay element 212 may delay the sampled training symbols by approximately one long training symbol duration (T) and first autocorrelation element 216 may multiply the sampled training symbols with the complex conjugate of the delayed sampled training symbols. In this embodiment, first moving average element 218 may perform a moving average, or integrate correlation output 217 over approximately 1.5 symbol durations (1.5T). This may result in moving average element 218 performing a moving average over approximately 96 samples.

Second autocorrelation frequency estimator 204 includes second autocorrelation element 226 to perform a second autocorrelation on the sampled training symbols and a delayed version of sampled training symbols to produce second correlation output 227. Second delay element 222 may delay sampled training symbols 201 by a second predetermined duration. Second conjugation element 224 may generate a complex conjugate of the delayed sampled training symbols for use by correlation element 226. Second moving average element 228 may perform a moving average over a predetermined number of durations on second correlation output 227. Angular extraction element 230 may extract second phase shift estimate 231 from a complex value generated by first moving average element 228.

In one embodiment, delay element 222 may delay the sampled training symbols by approximately two long training symbol durations (2T) and second autocorrelation element 226 may multiply the sampled training symbols with the complex conjugate of the delayed sampled training symbols. In this embodiment, second moving average element 228 may perform a moving average, or integrate correlation output 227 over approximately 0.5 long training symbol durations (0.5T). This may result in moving average element 228 performing a moving average over approximately 32 samples.

Phase corrector 208 may adjust second phase shift estimate 231 by a multiple of $2\pi$. In one embodiment, the second phase shift estimate 231 may be adjusted, when a difference between first phase shift estimate 221 and second phase shift estimate 231 exceeds $\pi$, by adding $+2\pi$ if the sign of first phase shift estimate 221 is positive and $-2\pi$ if the sign of first phase shift estimate 221 is negative. Summator may convert first and second phase shift estimates 221 and 231 to first and second weighted frequency estimates prior to combining to generate frequency offset estimate 232. In one embodiment, summator 206 may multiply first phase shift estimate 221 by $w2/4\pi T$ to generate a first weighted frequency estimate, and may multiply second phase shift estimate 231 by $w_2/4\pi T$ to generate a second weighted frequency estimate. Weights $w_1$ and $w_2$ may be provided by weights 210 and T may be the duration of a training symbol.

Weights $w_1$ and $w_2$ may be calculated analytically using the theoretical expressions for accuracy of phase shift estimates as performed by autocorrelation frequency estimator 202 and autocorrelation frequency estimator 204. The performance characteristics of autocorrelation frequency estimators may, among other things, depend on a signal-to-noise ratio (SNR), a number of samples used in averaging, and the delay time. Although autocorrelation frequency estimator 202 and autocorrelation frequency estimator 204 may use substantially the same sequence of samples for autocorrelation, different pairs of samples may be used for the averaging to produce first and second phase shift estimates 221 and 232. The obtained phase shift estimates may therefore be weakly correlated (i.e., having a correlation coefficient between estimates of between 0.4 and 0.5) and accordingly, weighting and summation by summator 206 may provide a more accurate estimate of the frequency offset. In one embodiment, which performs autocorrelations on a predetermined number of long training symbols, weight $w_1$ may be 0.6 and weight $w_2$ may be 0.4, although other weighting values may are also suitable depending on, among other things, the averaging and delay times used in the autocorrelation.

In one embodiment, the training symbols may be sampled long training symbols comprised of a plurality of modulated subcarriers having known training values. The long training symbols may be periodic and may have a period equal to the duration (T) of one training symbol. The long training symbols may be located on pilot subcarriers comprising, for example, approximately 52 BPSK-modulated subcarriers having known values and having a duration of approximately between three and four microseconds. Suitable training symbols include the long training symbols of on OFDM packet in accordance with the IEEE 802.11a standard having a duration (T) of approximately 3.2 microseconds. The long training symbols may be cyclically extended in a guard interval of half the duration. The channel long training symbols may be part of a long sequence (e.g., sequences GI2, T1 and T2) in accordance with the IEEE 802.11a standard.

In one embodiment, frequency offset estimate 232 is a fine frequency offset estimate and may be applied to a phase rotator, such as phase rotator 141 (FIG. 1), to rotate the phase of input symbols prior to performing a FFT on subsequent data symbols of an OFDM packet. In this embodiment, the phase shift of the phase rotator may be held constant during the performance of the FFT on the subsequent data symbols.

In yet another embodiment, two-channel frequency offset estimator 200 may also be included as part of short training symbol processing unit 106 (FIG. 1) to generate coarse frequency offset estimate 107 (FIG. 1). In this embodiment, coarse frequency offset estimate signal 107 (FIG. 1) may be used to control or adjust a frequency for down-converting an IF signal to in-phase (I) signals and quadrature phase (Q) signals at zero frequency. Coarse frequency offset estimate signal 107 may be used to control a frequency controllable device, such as voltage-controlled oscillator (VCO) 122 (FIG. 1). In this embodiment, sampled training symbols 201 may be comprised of sampled short training symbols modulated on a portion of a plurality of subcarriers and may have known training values. For example, the short training symbols may be modulated on approximately 12 predetermined subcarriers of approximately 52 available subcarriers. The short training symbols may be periodic and may have a period equal to their duration. The duration of one of the short training symbols may be less than approximately one microsecond, and in one embodiment, may be approximately 800 nanoseconds. Suitable short training symbols include the short training symbols of on OFDM packet in accordance with the IEEE 802.11a standard.

The autocorrelations performed by first autocorrelation frequency estimator 202 and second autocorrelation frequency estimator 204 may be performed concurrently (i.e., substantially in parallel) and may use substantially the same sequence of samples, however different pairs of samples may be used in performing the moving averages and generating the first and second frequency offset estimates 221, and 231.

Two-channel frequency offset estimator 200 may provide for improved frequency offset estimation accuracy with a decrease of up to 1.4 times or greater in the variance of frequency offset estimates without significant increase complexity over conventional frequency offset estimation techniques. Estimator 200 may allow optimization by delay lines using memory and may be convenient for parallelizaton and "on the fly" signal processing techniques. In one embodiment, the capturing band of estimator 200 may be about equal to the capturing band of a convention autocorrelation estimator with a time delay of one training-symbol duration. Because two-channel frequency offset estimator 200 may rely on the periodicity of an OFDM training sequence, the frequency-offset estimates may be robust to linear distortions in frequency selective channels.

Figure 3:
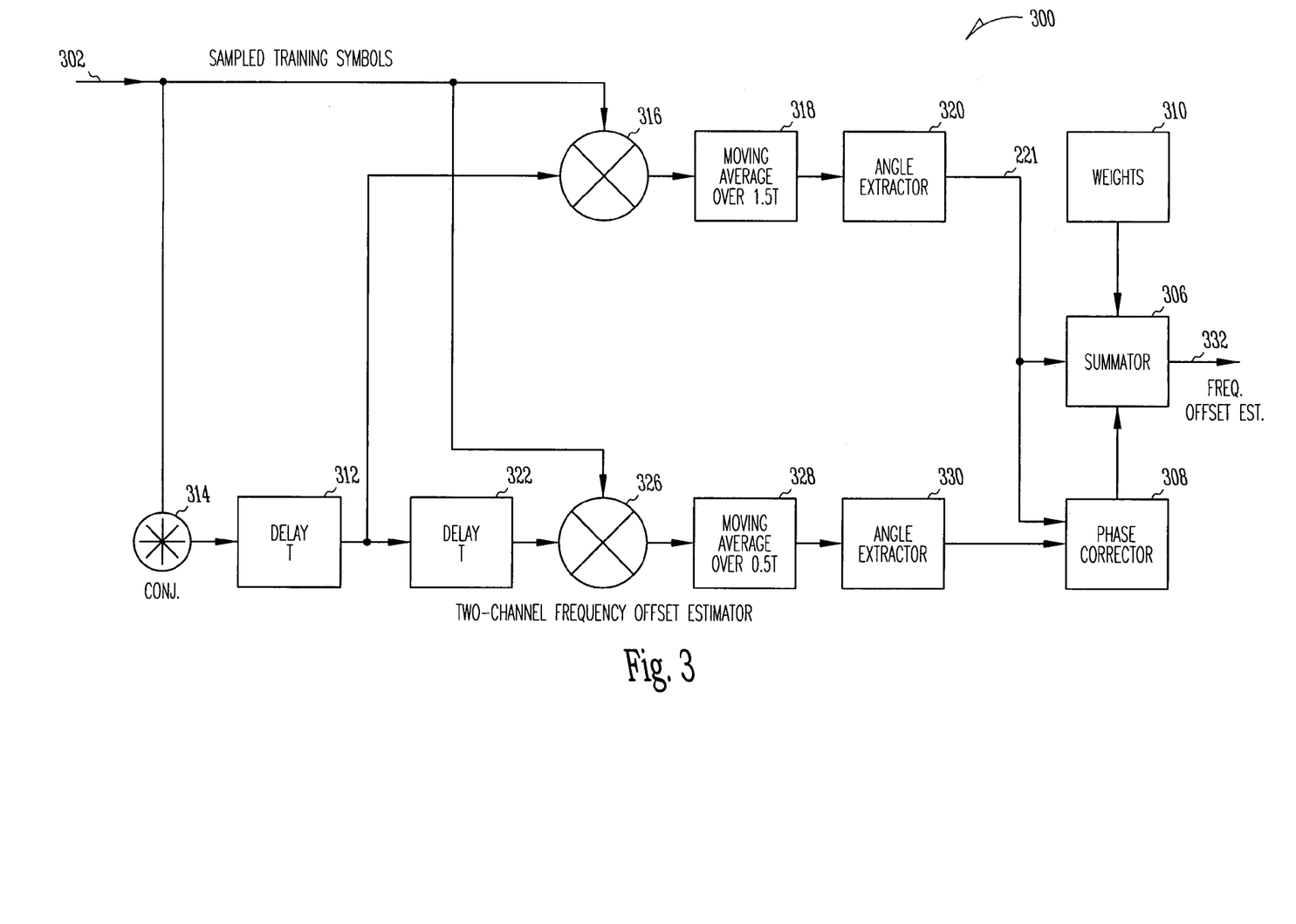
FIG. 3 is a simplified block diagram of a two-channel frequency offset estimator in accordance with another embodiment of the present invention.

FIG. 3 is a simplified block diagram of a two-channel frequency offset estimator in accordance with another embodiment of the present invention. Two-channel frequency offset estimator 300 may be used by an OFDM receiver, such as OFDM receiver system 100 (FIG. 1), to estimate a fine frequency offset of an OFDM packet using a two-channel frequency offset estimation scheme. Estimator 300 is suitable for use as an alternate for estimator 200 (FIG. 2). The fine frequency offset estimate may be used to help achieve frequency synchronization to an OFDM packet. In accordance with this embodiment, concurrent autocorrelations may be performed with training symbols of differing delays. The respective correlation outputs may be integrated over predetermined durations to generate phase shift estimates. The phase shift estimates may be weighted and combined to generate the fine frequency offset estimate. In one embodiment, the fine frequency offset estimate may be used to rotate the phase of OFDM data symbols prior to performing a Fast Fourier Transform (FFT) on the data symbols. In one embodiment, two-channel frequency offset estimator 300 may be included as part of long training symbol processing unit 108 (FIG. 1) to generate fine frequency offset 109 (FIG. 1).

In one embodiment, two-channel frequency offset estimator 300 may be a PHY level component of a wireless device. The elements of two-channel frequency offset estimator 300 illustrated in FIG. 3 may be implemented with hardware elements, software elements and combinations thereof, including with software configured processing elements. Furthermore, any two or more of the elements may be implemented together.

Elements 306, 308, 310, 316, 318, 320, 326, 328 and 330 of two-channel frequency offset estimator 300 operate substantially similarly to corresponding elements 206, 208, 210, 216, 218, 220, 226, 228 and 230 of two-channel frequency estimator 200 (FIG. 2) to generate frequency offset estimate 332. Estimator 300, however, may utilize sequential delay elements 312 and 322 to each delay sampled training symbols by a predetermined duration. First autocorrelation element 316 may receive training symbols delayed by first delay element 312 and second autocorrelation element 326 may receive training symbols delayed by first and second delay elements 312 and 322. Conjugation element 314 may generate a complex conjugate of sampled training symbols 302 prior to being delayed by delay elements 312 and 322.

In one embodiment, frequency offset estimate 332 is a fine frequency offset estimate and may be applied to a phase rotator, such as phase rotator 141 (FIG. 1), to rotate the phase of input symbols prior to performing a FFT on subsequent data symbols of an OFDM packet. In yet another embodiment, two-channel frequency offset estimator 300 may also be included as part of short training symbol processing unit 106 (FIG. 1) to generate coarse frequency offset estimate 107 (FIG. 1).

Figure 4:
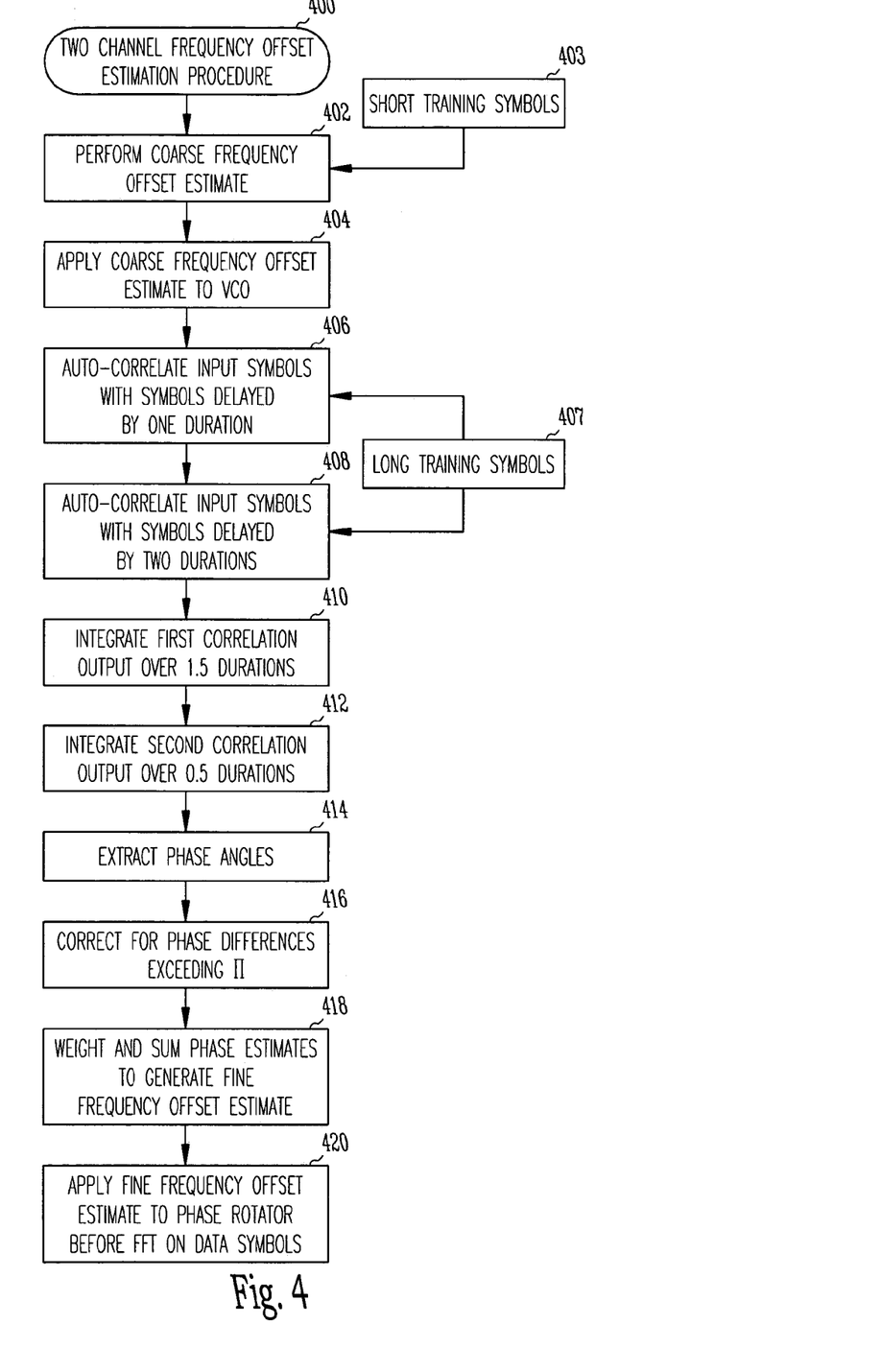
FIG. 4 is a flow chart of a two-channel frequency offset estimation procedure in accordance with an embodiment of the present invention.

FIG. 4 is a flow chart of a two-channel frequency offset estimation procedure in accordance with an embodiment of the present invention. Two-channel frequency offset estimation procedure 400 may be used by an OFDM receiver system, such as OFDM receiver system 100 (FIG. 1) for fine frequency offset estimation. In one embodiment, procedure 400 may be performed by a long training symbol processing unit, such as unit 108 (FIG. 1) to generate fine frequency offset estimate 109 (FIG. 1). In other embodiments, two-channel frequency offset estimator 200 (FIG. 2) or two-channel frequency offset estimator 300 (FIG. 3) may perform portions of procedure 400. In these embodiments, procedure 400 may use sampled long training symbols, such as the long training symbols of an IEEE 802.11a compliant packet, to generate the fine frequency offset estimate. In this embodiment, the fine frequency offset estimate may be applied to a phase rotator to rotate the phase of input symbols prior to performing a Fast Fourier Transform (FFT) on subsequent data symbols of an OFDM packet. In an alternate embodiment, procedure 400 may use sampled short training symbols, such as the short training symbols of an IEEE 802.11a compliant packet, to generate a coarse frequency offset for controlling IF down-conversion of a received OFDM signal. Although the individual operations of procedure 400 are illustrated and described as separate operations, one or more of the individual operations may be performed concurrently and nothing requires that the operations be performed in the order illustrated.

Operation 402 may use short training symbols 403 to perform a coarse frequency offset estimate for an OFDM packet. In one embodiment, operation 402 may use a two-channel frequency offset estimator, such as estimator 200 (FIG. 2) or estimator 300 (FIG. 3), although other estimators are also suitable. Operation 404 may use the coarse frequency offset to control or adjust a frequency for down-converting an IF signal to in-phase (I) signals and quadrature phase (Q) signals at zero frequency in an RF receiver unit, such as RF receiver unit 102 of system 100 (FIG. 1).

Once coarse frequency offset corrections have been made, operations 406 through 420 may be performed. Operation 406 performs an autocorrelation using long training symbols 107 and a delayed version of the long training symbols to produce a first correlation output. In one embodiment, operation 406 may perform the autocorrelation with long training symbols delayed by one duration. Operation 408 performs an autocorrelation using long training symbols 107 and a delayed version of the long training symbols to produce a second correlation output. In one embodiment, operation 408 may perform the autocorrelation with long training symbols delayed by two durations. Operations 406 and 408 may be performed in parallel using substantially the same long training symbols or symbol stream. In one embodiment, operation 406 may be performed by autocorrelation element 216 (FIG. 2), and operation 408 may be performed by autocorrelation element 226 (FIG. 2).

Operation 410 may perform a moving average on the correlation outputs generated by operation 406, and in one embodiment, may perform an integration over 1.5 long training symbol durations. Operation 412 may perform a moving average on the correlation outputs generated by operation 408 and in one embodiment, may perform an integration over 0.5 long training symbol durations. Operation 414 extracts the phase angle from the complex outputs generated by operations 410 and 412 to produce first and second phase shift estimates. Operation 416 may adjust the second phase shift estimate by a multiple of $2\pi$ when the difference between the first and second phase shift estimates exceeds $\pi$. In one embodiment, operation 410 may be performed by moving average element 218 (FIG. 2), operation 412 may be performed by moving average element 228 (FIG. 2), operation 414 may be performed by angle extractors 220 (FIG. 2) and 230 (FIG. 2), and operation 416 may be performed by phase corrector 208 (FIG. 2).

Operation 418 may combine the first and second phase shift estimates to generate a frequency-offset estimate. In one embodiment, operation 418 may convert the first and second phase shift estimates to first and second frequency estimates, and may weight the frequency estimates before adding the weighted frequency estimates together to generate the frequency offset estimate. In one embodiment, operation 418 may be performed by summator 206 (FIG. 2) using weights 210 (FIG. 2).

In operation 420, the frequency-offset estimate generated in operation 418 may be used to rotate the phase of subsequent data symbols of an OFDM packet prior to performing an FFT on the data symbols. In one embodiment, operation 420 may be performed by phase rotator 141 (FIG. 1).

Thus, an orthogonal frequency division multiplexed (OFDM) receiver and method has been described that may achieve improved frequency synchronization. The system and method may utilize a two-channel frequency offset estimation that generates a fine frequency offset by performing concurrent autocorrelations on training symbols delayed by differing durations. The fine frequency offset estimate may be used to rotate the phase of OFDM data symbols prior to performing a FFT on the data symbols.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A parallel-channel frequency-offset estimator to generate a frequency offset estimate comprising:
   a first autocorrelation element to perform a first autocorrelation on a serial symbol stream of training symbols delayed by a first duration to produce a first correlation output;
   a second autocorrelation element to perform a second autocorrelation on the serial symbol stream delayed by a second duration to produce a second correlation output;
   a first moving average element to perform a first moving average on the first correlation output for use in generating a first phase shift estimate; and
   a second moving average element to perform a second moving average on the second correlation output for use in generating a second phase shift estimate,
   wherein the first duration is a duration of one of the training symbols, and the second duration is twice the first duration, and wherein the first moving average element performs the first moving average over approximately one and a half durations, and the second moving average element performs the second moving average over approximately one-half durations on the second correlation output.

2. The frequency-offset estimator of claim 1 wherein the frequency offset estimate is a fine frequency offset estimate and is applied to a phase rotator to rotate the phase of data symbols of an orthogonal frequency division multiplexed (OFDM) packet prior to performing a Fast Fourier Transform (FFT).

3. The frequency-offset estimator of claim 1 further comprising a phase correction element to adjust the second phase shift estimate by a multiple of $2\pi$ when a difference between the first and second phase shift estimates exceed $\pi$.

4. A two-channel freguency-offset estimator to generate a frequency offset estimate comprising:
   a first autocorrelation element to perform a first autocorrelation on a serial symbol stream of training symbols delayed by a first duration to produce a first correlation output;
   a second autocorrelation element to perform a second autocorrelation on the serial symbol stream delayed by a second duration to produce a second correlation output;
   a first moving average element to perform a first moving average on the first correlation output for use in generating a first phase shift estimate;
   a second moving average element to perform a second moving average on the second correlation output for use in generating a second phase shift estimate; and
   a summator to combine the first and second phase shift estimates to generate a frequency offset estimate, wherein the summator multiplies the first phase shift estimate by $w_1/2\pi T$ to generate a first weighted frequency estimate, and multiplies the second phase shift estimate by $w_2/4\pi T$ to generate a second weighted frequency estimate, and combines the first and second weighted frequency estimates to generate the frequency offset estimate, wherein $w_1$ and $w_2$ are weights and T is the duration.

5. The frequency-offset estimator of claim 3 wherein the frequency offset estimate is applied to a phase rotator to shift a phase of symbols of an orthogonal frequency division multiplexed (OFDM) packet prior to performing a Fast Fourier Transform (FFT), the phase shift being held constant for performing the FFT on subsequent data symbols of the OFDM packet.

6. The frequency-offset estimator of claim 1 wherein the training symbols are sampled long training symbols comprised of a plurality of modulated subcarriers having known training values.

7. The frequency-offset estimator of claim 6 wherein the long training symbols are periodic having a period equal to the duration.

8. The frequency-offset estimator of claim 1 wherein further comprising;
a conjugation element to generate a complex conjugate of the training symbols.

9. The frequency-offset estimator of claim 1 wherein the first autocorrelation element multiples the training symbols with a complex conjugate of the training symbols delayed by approximately one duration, and
wherein the second autocorrelation element multiples the symbol stream of training symbols with a complex conjugate of the symbol stream of training symbols delayed by approximately two durations.

10. The frequency-offset estimator of claim 1 wherein the first duration is a duration of one of the training symbols, and the second duration is twice the first duration, and wherein the first moving average element performs a first integration over 1.5 symbol durations and produces a first complex value, wherein the second moving average element performs a second integration over 0.5 symbol durations and produces a second complex value,
and wherein the frequency-offset estimator further comprises:
a first angular extraction element to extract the first phase shift estimate from the first complex value; and
a second angular extraction element to extract the second phase shift estimate from the second complex value.

11. The frequency-offset estimator of claim 1 wherein the frequency offset estimate is a coarse frequency offset estimate to adjust a frequency for down-converting an IF input signal to the serial symbol stream.

12. The frequency-offset estimator of claim 11 wherein the serial symbol stream is comprised of sampled short training symbols modulated on a portion of a plurality of subcarriers, the short training symbols having known training values.

13. A method for frequency synchronization of an orthogonal frequency division multiplexed (OFDM) signal comprising:
generating a frequency offset estimate using first and second phase shift estimates, the first phase shift estimate generated from a serial symbol stream of training symbols with the symbol stream delayed by approximately a first duration, the second phase shift estimate generated from the serial symbol stream with the symbol stream delayed by a second duration, wherein the first duration is a duration of one of the training symbols, and the second duration is twice the first duration, and wherein integrating the first correlation output includes integrating the first correlation output over approximately one and a half durations, and wherein integrating the second correlation output includes integrating the second correlation output over approximately one-half durations.

14. The method of claim 13 wherein generating comprises: autocorrelating the serial symbol stream of training symbols with the symbol stream delayed by approximately the first duration to produce a first correlation output; autocorrelating the serial symbol stream with the symbol stream delayed by the second duration to produce a second correlation output; integrating the first correlation output to generate the first phase shift estimate; integrating the second correlation output to generate the second phase shift estimate; and combining the first and second phase shift estimates to generate the frequency offset estimate.

15. The method of claim 14 further comprising:
rotating a phase of data symbols of an OFDM packet by applying the frequency offset estimate to a phase rotator to rotate the phase of input symbols by an amount of phase shift based on the frequency offset estimate prior to performing an FFT on the data symbols; and
holding the amount of phase shift constant for performing the FFT on the data symbols.

16. The method of claim 13 further comprising adjusting the second phase shift estimate by a multiple of $2\pi$ when a difference between the first and second phase shift estimates exceed $\pi$.

17. A method for frequency synchronization of an orthogonal frequency division multiplexed (OFDM) signal comprising:
generating a frequency offset estimate using first and second phase shift estimates, the first phase shift estimate generated from a serial symbol stream of training symbols with the symbol stream delayed by approximately a first duration, the second phase shift estimate generated from the serial symbol stream with the symbol stream delayed by a second duration,
wherein generating comprises:
autocorrelating the serial symbol stream of training symbols with the symbol stream delayed by approximately the first duration to produce a first correlation output;
autocorrelating the serial symbol stream with the symbol stream delayed by the second duration to produce a second correlation output;
integrating the first correlation output to generate the first phase shift estimate;
integrating the second correlation output to generate the second phase shift estimate; and
combining the first and second phase shift estimates to generate the frequency offset estimate, and
wherein combining includes multiplying the first phase shift estimate by $w_1/2\pi T$ to generate a first weighted frequency estimate; multiplying the second phase shift estimate by $w_2/4\pi T$ to generate a second weighted frequency estimate; and summing the first and second weighted frequency estimate to generate the frequency offset estimate, wherein $w_1$ and $w_2$ are weights and T is the duration.

18. The method of claim 13 wherein the training symbols are sampled long training symbols comprised of a plurality of modulated subcarriers having known training values.

19. The method of claim 13 further comprising:
generating a complex conjugate of the training symbols; and
delaying the training symbols at least by the duration.

20. An orthogonal frequency division multiplexed (OFDM) receiver system comprising:

a dipole antenna to receive signals that include an OFDM packet;

an RF receive unit to convert the OFDM packet to a stream of symbols;

a data symbol processing unit to perform a Fast Fourier Transform (FFT) on the stream of symbols to generate a decoded bit stream; and a parallel-channel frequency offset estimator to generate a frequency offset estimate using training symbols of the stream of symbols to rotate a phase of data symbols of the OFDM packet prior to performing the FFT, wherein the parallel-channel freguency-offset estimator comprises:

a first autocorrelation element to perform a first autocorrelation on a serial symbol stream of training symbols delayed by a first duration to produce a first correlation output;

a second autocorrelation element to perform a second autocorrelation on the serial symbol stream delayed by a second duration to produce a second correlation output;

a first moving average element to perform a first moving average on the first correlation output for use in generating a first phase shift estimate; and a second moving average element to perform a second moving average on the second correlation output for use in generating a second phase shift estimate, wherein the first duration is a duration of one of the training symbols, and the second duration is twice the first duration, and wherein the first moving average element performs the first moving average over approximately one and a half durations, and the second moving average element performs the second moving average over approximately one-half durations on the second correlation output.

21. The OFDM receiver system of claim 20 wherein the data symbol processing unit includes a phase rotator responsive to the frequency offset estimate, and wherein the two-channel frequency offset estimator further comprises:

a summator to combine the first and second phase shift estimates to generate the frequency offset estimate.

22. The OFDM receiver system of claim 21 wherein the data symbol processing unit further includes a phase correction element to adjust the second phase shift estimate by a multiple of $2\pi$ when a difference between the first and second phase shift estimates exceed $\pi$.

23. An orthogonal frequency division multiplexed (OFDM) receiver system comprising:

a dipole antenna to receive signals that include an OFDM packet;

an RF receive unit to convert the OFDM packet to a stream of symbols;

a data symbol processing unit to perform a Fast Fourier Transform (FFT) on the stream of symbols to generate a decoded bit stream; and a two-channel freguency offset estimator to generate a freguency offset estimate using training symbols of the stream of symbols to rotate a phase of data symbols of the OFDM packet prior to performing the FFT, wherein the data symbol processing unit includes a phase rotator responsive to the frequency offset estimate, and wherein the two-channel frequency offset estimator includes:

a first autocorrelation element to perform a first autocorrelation on a symbol stream of training symbols delayed by a first duration to produce a first correlation output;

a second autocorrelation element to perform a second autocorrelation on the symbol stream of training symbols delayed by a second duration to produce a second correlation output;

a first moving average element to perform a first moving average on the first correlation output for use in generating a first phase shift estimate;

a second moving average element to perform a second moving average on the second correlation output for use in generating a second phase shift estimate; and a summator to combine the first and second phase shift estimates to generate the frequency offset estimate, and wherein the summator multiples the first phase shift estimate by $w_1/2\pi T$ to generate a first weighted frequency estimate, and multiples the second phase shift estimate by $w_2/4\pi T$ to generate a second weighted frequency estimate, and combines the first and second weighted frequency estimates to generate the frequency offset estimate, wherein $w_1$ and $w_2$ are weights and T is the duration.

24. An article comprising a storage medium having stored thereon instructions, that when executed by a computing platform, result in:

autocorrelating a serial symbol stream of training symbols with the symbol stream delayed by approximately a first duration to produce a first correlation output;

autocorrelating the serial symbol stream with the symbol stream delayed by a second duration to produce a second correlation output;

integrating the first correlation output to generate a first phase shift estimate;

integrating the second correlation output to generate a second phase shift estimate; and combining the first and second phase shift estimates to generate a frequency offset estimate, wherein the first duration is a duration of one of the training symbols, and the second duration is twice the first, duration, and wherein integrating the first correlation output includes integrating the first correlation output over approximately one and a half durations, and wherein integrating the second correlation output includes integrating the second correlation output over approximately one-half durations.

25. The article of claim 24 wherein the instructions further result in rotating a phase of data symbols of an orthogonal frequency division multiplexed (OFDM) packet by applying the frequency offset estimate to a phase rotator to rotate the phase of input symbols by an amount of phase shift based on the frequency offset estimate prior to performing an FFT on the data symbols.

26. The article of claim 25 wherein the instructions further result in:

holding the amount of phase shift constant for performing the FFT on the data symbols, and resulting in frequency synchronization of an orthogonal frequency division multiplexed (OFDM) signal that includes the OFDM packet.

* * * * *

UNITED STATES PATENT AND TRADEMARK OFFICE
CERTIFICATE OF CORRECTION

| | | |
|---|---|---|
| PATENT NO. | : 7,336,597 B2 | Page 1 of 1 |
| APPLICATION NO. | : 10/675240 | |
| DATED | : February 26, 2008 | |
| INVENTOR(S) | : Maltsev et al. | |

It is certified that error appears in the above-identified patent and that said Letters Patent is hereby corrected as shown below:

In column 10, line 46, in Claim 4, delete "freguency" and insert -- frequency --, therefor.

In column 12, line 29, in Claim 17, delete "freguency" and insert -- frequency --, therefor.

In column 13, line 12, in Claim 20, delete "freguency" and insert -- frequency --, therefor.

In column 13, line 56, in Claim 23, delete "freguency" and insert -- frequency --, therefor.

In column 13, line 57, in Claim 23, delete "freguency" and insert -- frequency --, therefor.

In column 14, line 41, in Claim 24, after "first" delete ",".

Signed and Sealed this

Twelfth Day of August, 2008

JON W. DUDAS
*Director of the United States Patent and Trademark Office*